United States Patent [19]
Weller

[11] 3,809,420
[45] May 7, 1974

[54] ENERGY ABSORBING BUMPER ASSEMBLY

[75] Inventor: Peter A. Weller, Dover, N.H.

[73] Assignee: McCord Corporation, Detroit, Mich.

[22] Filed: July 1, 1971

[21] Appl. No.: 158,918

[52] U.S. Cl.................. 293/70, 293/89, 188/1 C
[51] Int. Cl............................................. B60r 19/08
[58] Field of Search............ 293/DIG. 3, DIG. 5, 60, 293/70, 71, 72, 84, 85, 88, 89; 188/1 C; 248/358 AA; 267/140, 141, 152, 153; 161/39, 77, 89, 144, 159, 160, 161, 178

[56] References Cited
UNITED STATES PATENTS

| | | | |
|---|---|---|---|
| 1,290,187 | 1/1919 | Helman et al. | 293/84 |
| 3,666,310 | 5/1972 | Burgess et al. | 293/71 R |
| 1,576,728 | 3/1926 | Dominguez | 293/84 |
| 2,979,739 | 4/1961 | Krakauer | 5/345 |
| 2,058,283 | 10/1936 | Wolff | 293/84 |
| 3,644,168 | 6/1970 | Bonk et al. | 161/161 |
| 3,582,446 | 6/1971 | Stolki | 161/89 |
| 3,473,836 | 10/1969 | Halter | 293/71 R |

Primary Examiner—Robert G. Sheridan
Assistant Examiner—Robert Saifer
Attorney, Agent, or Firm—McGlynn and Milton

[57] ABSTRACT

An energy absorbing bumper assembly including an inner member and outer member spaced from the inner member and an elongated central member disposed between the inner and outer members and generally parallel thereto. Energy absorbing means connect the length of the central member to the inner and outer members respectively for absorbing energy along the entire length of the central member while moving the central member longitudinally in response to a force applied to the outer means along only a portion of the predetermined length to move the outer member toward the inner member. The energy absorbing means includes elements extending from opposite sides of the central member at an acute angle relative thereto and generally in the same direction longitudinally of the central member. The assembly may include one or more central members as well as additional yieldable means for absorbing energy.

16 Claims, 6 Drawing Figures

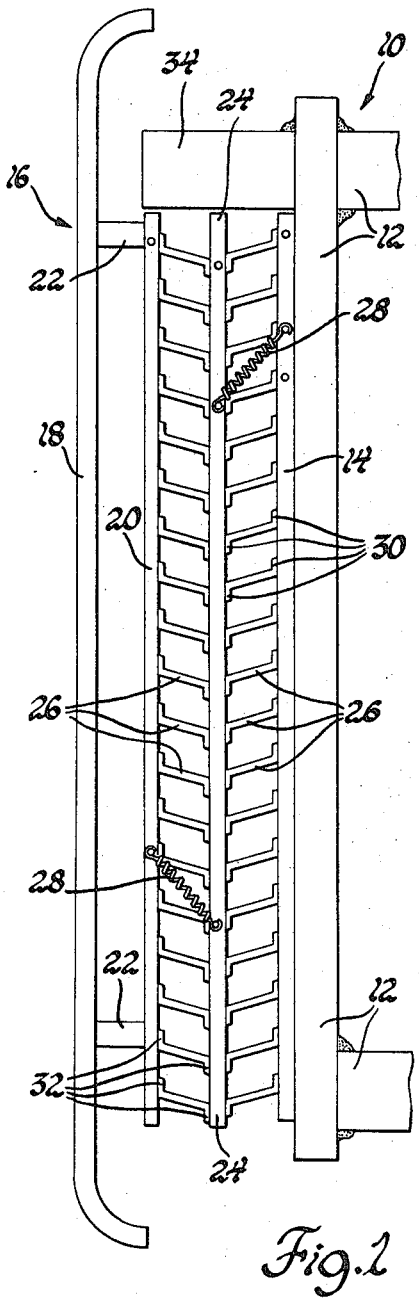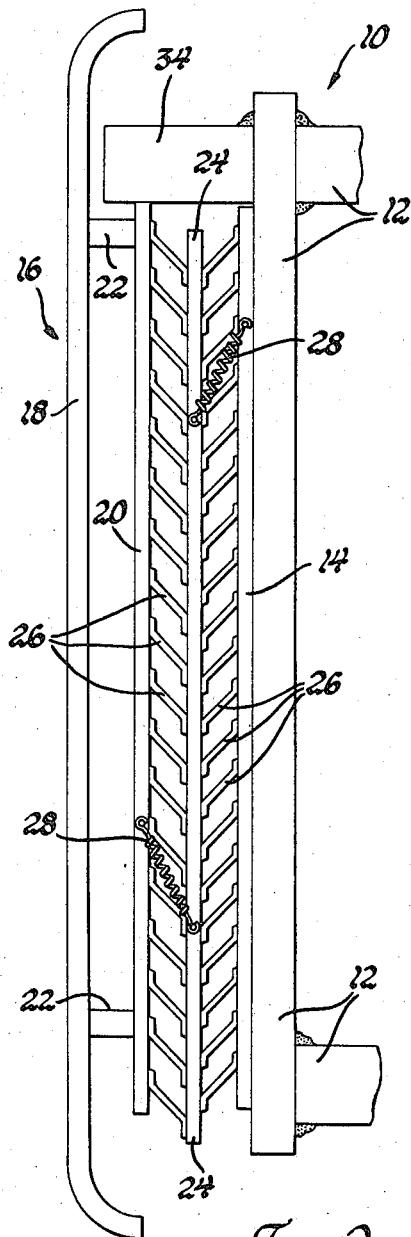
Fig.1
Fig.2

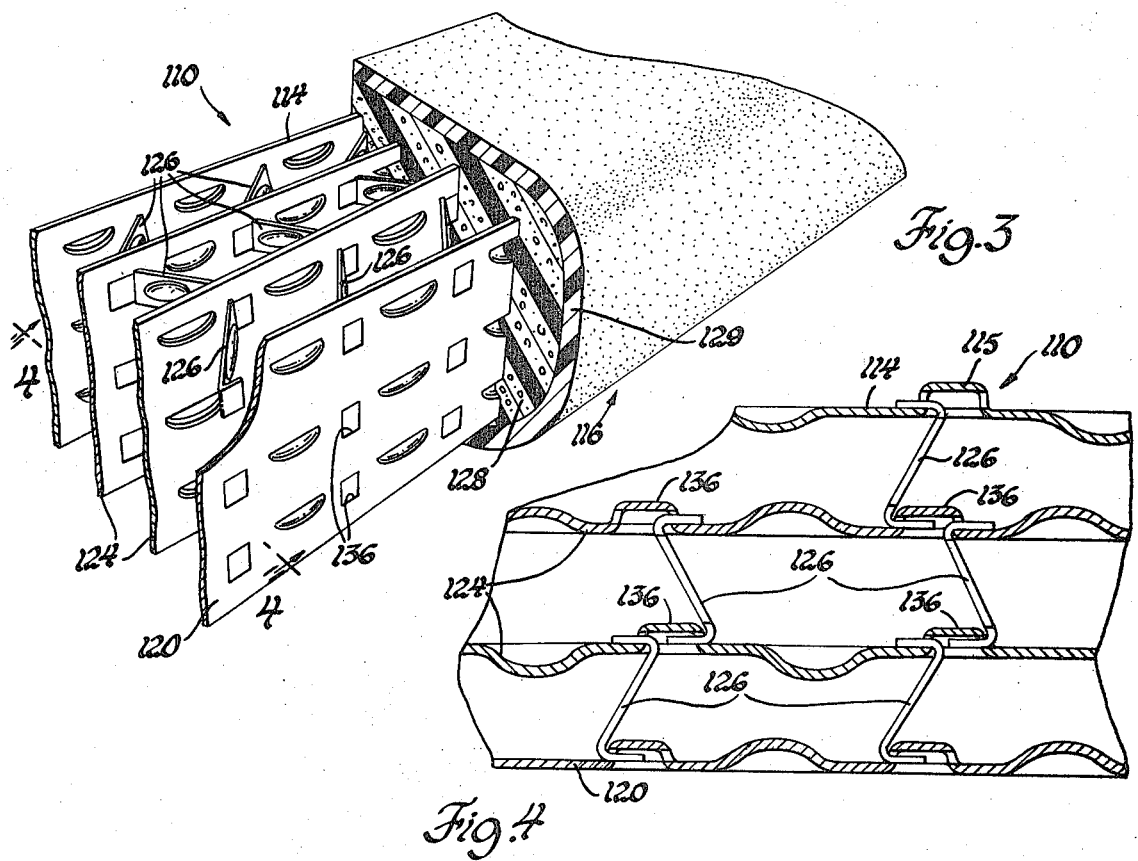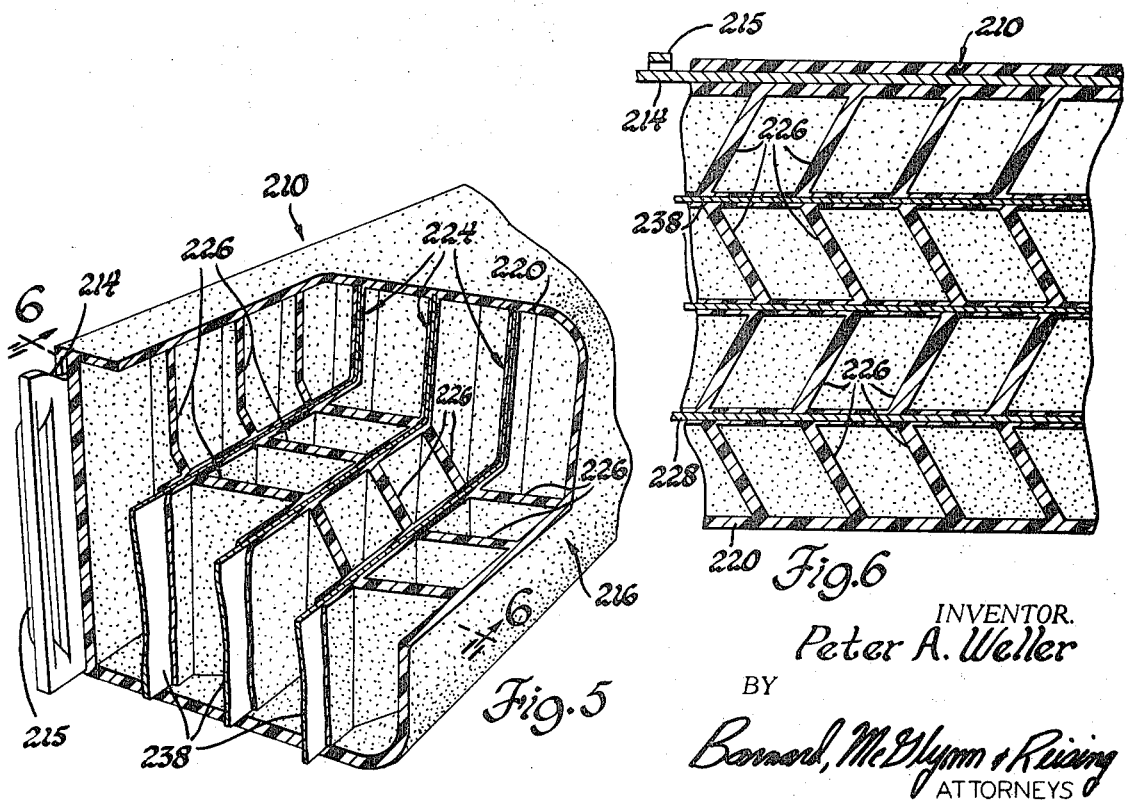

ENERGY ABSORBING BUMPER ASSEMBLY

This invention relates to an energy absorbing bumper assembly of the type utilized in vehicles to render a vehicle more safe by absorbing energy upon impact of the vehicle bumper with a foreign object.

There are numerous energy absorbing bumper assemblies known to the prior art and these assemblies employ various means for absorbing energy. The present invention, however, is directed to a particular type of energy absorbing bumper assembly which includes a deformable means in a novel combination of components for absorbing energy. In such bumper assemblies the deformable means usually deforms and absorbs energy only in the immediate area where contact is made with a foreign object. In ther words, only a portion of the bumper assembly absorbs the energy of impact. An example of one such prior art assembly is shown in U.S. Pat. No. 3,506,295 wherein a bumper is supported or attached to the frame of a vehicle through a sheet divided into rows of corrugations which deform upon movement of the bumper toward the frame. In such an assembly, the corrugations deform only in the area of impact with the bumper so that all of the energy is absorbed in a small area, whereby the deformable members may be completely deformed resulting in a transmission of impact forces to the vehicle frame.

It is an object and feature of this invention, however, to provide an improved energy absorbing bumper assembly which includes energy absorbing means which will absorb energy along the entire length of the bumper, even when the bumper is impacted only in a small area along a portion of its length.

In correlation with the foregoing object and feature, it is another object and feature of this invention to provide such an energy absorbing bumper assembly which includes a central means with inner and outer means disposed on opposite sides thereof and generally parallel thereto with energy absorbing means connecting the central means to the inner and outer means respectively for absorbing energy along a predetermined length thereof while moving the central member longitudinally in response to a force applied to the outer means along only a portion of its length to move the outer means toward the inner means.

Other objects and attendant advantages of the present invention will be readily appreciated as the same becomes better understood by reference to the following detailed description when considered in connection with the accompanying drawings wherein;

FIG. 1 is a plan view of one preferred embodiment of the instant invention showing the bumper assembly in the normal installed position;

FIG. 2 is a view similar to FIG. 1 but showing the bumper assembly thereof in a position after impact and the absorption of energy;

FIG. 3 is a fragmentary partially broken away perspective view of another preferred embodiment of the instant invention;

FIG. 4 is a fragmentary cross sectional view taken substantially along line 4—4 of FIG. 3;

FIG. 5 is a fragmentary partially broken away perspective view of yet another embodiment of the instant invention; and FIG. 6 is a fragmentary cross sectional view taken substantially along the line 6—6 of FIG. 5.

Referring now to the drawings, the three embodiments illustrated will be described simultaneously with like numerals separated by one hundred between the various embodiments. Energy absorbing bumper assemblies constructed in accordance with the instant invention are generally shown at 10 in FIGS. 1 and 2, at 110 in FIGS. 3 and 4, and at 210 in FIGS. 5 and 6.

The energy absorbing bumper assembly includes an inner means or member, which is shown at 14 in the embodiment of FIGS. 1 and 2, and which inner means includes plates 114 and 214 in the embodiments of FIGS. 3 through 6 and which inner means are adapted to be attached to a vehicle frame 12 by bolts, welding, or the like. The inner member 114 of the embodiment of FIGS. 3 and 4 includes a metal plate as will become more clear hereinafter and includes a bent out portion 115 which is adapted for bolting to the frame of the vehicle. In a similar manner, the inner member 214 of the embodiment of FIGS. 5 and 6 includes a metal plate having a bent out portion 215 which is adapted for attachment to the frame of the vehicle.

In the embodiment 10 of FIGS. 1 and 2 there is included a bumper means generally indicated at 16 and spaced from the inner member 14. The bumper means 16 includes the bumper 18, and the outer member 20, which is connected to the bumper 18 by the connecting members 22.

The bumper means generally indicated at 16 is that portion of the assembly which would contact a foreign object and receive the first impact. In an analogous manner, the bumper means of the embodiment of FIGS. 3 and 4 is generally shown at 116 and in a similar fashion generally indicated at 216 in FIGS. 5 and 6.

Each assembly also includes at least one central means or centrally disposed elongated longitudinally extending member disposed between the inner and outer members. The embodiment of FIGS. 1 and 2 includes one such centrally extending member 24, member 24 being parallel to the inner and outer members 14 and 20 respectively. The embodiment of FIGS. 3 and 4 includes an outer member 120 and the embodiment of FIGS. 5 and 6 includes an outer member 220. The embodiment of FIGS. 3 and 4 includes two longitudinally extending central members 124. The embodiments of FIGS. 5 and 6 includes three longitudinally extending central members, each of which is generally indicated at 224.

Each assembly also includes energy absorbing means connecting a predetermined length of the central members to the inner and outer members respectively for absorbing energy along the entire predetermined length of the central members while moving the central members longitudinally in response to a force applied to the outer member along only a portion of the predetermined length to move the outer member toward the inner member. The energy absorbing means includes elements 26, 126 and 226. These elements extend from opposite sides of the central members and at an acute angle relative thereto. The elements that extend from one side of each central member extend at the acute angle in the same general direction longitudinally of that central member as the elements extending from the other side. More specifically, the elements 26 extend from opposite sides of the central member 24 and the elements 26 on one side of the member 24 extend at an acute angle and in the same general direction longitudinally of the central member 24 as the elements extending from the other side, the same general direction being upwardly along the longitudinal axis of the member 24 as viewed in FIGS. 1 and 2. The same is true of the elements 126 and 226 respectively.

The energy absorbing means also includes yieldable means for absorbing energy as the central members move longitudinally. In the embodiment of FIGS. 1 and 2, the yieldable means comprises stretchable springs 28 which connect the central member 24 to the inner member 14 and the outer member 20. In the embodiment of FIGS. 3 and 4, the yieldable means comprises elastomeric material 128 disposed in the spaces between the elements 126, the central members 124 and the inner and outer members 114 and 120. More specifically, the members 114, 120 and 124 as well as the elements 126 of the embodiment of FIGS. 3 and 4 are completely encapsulated in the elastomeric material 128. The elastomeric material 128 has a smooth surface or separate covering 129. The elastomeric material 128 comprises polyurethane or the like, which, as is well known, is self-skinning, whereby the surface or coating 129 may be formed.

Although not shown, the cellular type construction of the embodiment of FIGS. 5 and 6 may also include an elastomeric material disposed in the spaces between the elements 226. Alternatively, the cells of this structure may be sealed with a specific orifice in the bottom wall of each cell to allow air to escape at a controlled rate to dissipate energy.

The elements 26 and 126 are generally ∫ shaped and comprise a central portion with parallel portions extending from each end thereof at an obtuse angle with respect thereto.

Referring to the embodiment of FIGS. 1 and 2, the parallel portions 30 of a first set of ∫ shaped elements 26 are attached to the central member 24 and the inner member 14 respectively. In a similar manner, the parallel portions 32 of a second set of the ∫ shaped elements 26 are attached to the central member 24 and the outer member 20.

The embodiments of FIGS. 1 and 2 may include a stop means 34 adjacent one end of the central member 24 for limiting longitudinal movement of the central member 24 to one direction, which is away from the stop means 34.

The elements 126 in the embodiment of FIGS. 3 and 4 are also ∫ shaped with the feet thereof mechanically attached to the members 114, 120 and 124. The members 114, 120 and 124 are similar metal plates having upsets 136 therein with which the feet of the ∫ shaped elements 126 coact and mechanically interconnect the plates. The ∫ shaped elements 126 are also made of metal.

In the embodiment of FIGS. 5 and 6, the cellular structure is basically made of a plastic material, however, metal plates of stringers are encased in various walls of the cellular structure. As alluded to hereinabove, the metal plate 214 is encased in the rear wall of the assembly so that the encased metal plate 214 and the plastic surrounding it define the inner member of the assembly. The metal plates or stringers 238 are encased in plastic, the three of which define the longitudinally extending central members 224. Although not shown, the elements 226 of the embodiment of FIGS. 5 and 6 may also include metal inserts.

Referring to the embodiment of FIGS. 1 and 2, the central portion of each ∫ shaped element, that portion which extends between the parallel portions 30 and between the parallel portions 32, extends toward the central member 24 in a direction away from the stop means 34, or generally in the same direction, longitudinally of the member 24. Thus, the elements 26 urge the central member 24 to move in a direction away from the stop means 34 upon movement of the outer member 20 toward the inner member 14. In other words, the central member 24 moves in a direction away from the stop means 34 from the position shown in FIG. 1 to the position shown in FIG. 2 as the outer member 20 is forced to move toward the inner member 14. As the outer member 20 moves from the position shown in FIG. 1 to the position shown in FIG. 2, the ∫ shaped elements 26 deform and absorb energy and the springs 28 stretch and yield to absorb additional energy.

The embodiment of FIGS. 3 and 4 differs basically from the first embodiment by including a plurality of central members and the elements 126 extend generally in opposite directions from adjacent central members 124. That is, the elements 126 extend generally in one direction longitudinally of one central member whereas they extend generally in the opposite direction from the next adjacent central member 124. The same is true of the embodiment of FIGS. 5 and 6.

In the embodiment of FIGS. 3 and 4, upon impact the forward bumper means portion 116 will compress whereby force will be applied to the outer plate 120 to move the outer plate 120 toward the inner plate 114. Because of the disposition of the elements 126, such a force will urge the first central plate 124 which is next adjacent the outer member 120 to move longitudinally to the right as viewed in FIGS. 3, and 4, whereas the next central member 124 next adjacent the inner member 114 will be urged to move to the left as viewed in FIGS. 3 and 4. While this movement is occurring the elastomeric material disposed between the elements 126 will be compressed to absorb energy. Furthermore, and most importantly, energy is absorbed along the entire length of the central members 124, even if the impact is at a localized position along the length of the assembly.

The same basic principle of operation occurs in the embodiment of FIGS. 5 and 6 in that energy is absorbed along the entire length of the assembly, as the central members 238 move longitudinally of themselves alternately in opposite directions.

The invention has been described in an illustrative manner, and it is to be understood that the terminology which has been used is intended to be in the nature of words of description rather than of limitation.

Obviously, many modifications and variations of the present invention are possible in light of the above teachings. It is therefore, to be understood that within the scope of the appended claims, the invention may be practiced otherwise than as specifically described.

The embodiments of the invention in which an exclusive property or privilege is claimed are defined as follows:

1. An energy absorbing bumper assembly comprising: an inner means, an outer means spaced from said inner means, an elongated central means including at least one central member disposed between said inner means and said outer means, and energy absorbing means connecting a predetermined length of said central means to said inner and outer means respectively for absorbing energy all along said predetermined length while moving said entire central member longitudinally in only one direction in response to a force applied to said outer means along only a portion of said predetermined length to move said outer means toward said inner means.

2. An assembly as set forth in claim 1 wherein said central member is generally parallel to said inner and outer means.

3. An assembly as set forth in claim 2 wherein said energy absorbing means includes elements extending from opposite sides of said central member and at an acute angle relative thereto, the elements extending from one side of said central member extend at said angle in the same general direction longitudinally of said central member as the elements extending from the other side thereof.

4. An assembly as set forth in claim 3 wherein said energy absorbing means further includes yieldable means for absorbing energy as said central member moves longitudinally.

5. An assembly as set forth in claim 4 wherein said yieldable means comprises stretchable means connecting said central member to at least one of said inner and outer means.

6. An assembly as set forth in claim 4 wherein said yieldable means comprises an elastomeric material disposed in the spaces between said elements.

7. An assembly as set forth in claim 6 wherein said elements and said central member are encapsulated in said elastomeric material.

8. An assembly as set forth in claim 7 wherein said outer means and said inner means are encapsulated in said elastomeric material.

9. An assembly as set forth in claim 7 wherein said central member comprises a metal plate and said elements comprise a central portion with parallel portions extending from each end thereof at an obtuse angle with respect thereto, said parallel portions of said elements being mechanically attached to said plate.

10. An assembly as set forth in claim 3 wherein said central member and said elements are made of a plastic material.

11. An assembly as set forth in claim 10 wherein at least some of said plastic material has metal encased therein.

12. An assembly as set forth in claim 3 wherein said central member comprises a metal plate and said elements comprise a central portion with parallel portions extending from each end thereof at an obtuse angle with respect thereto, said parallel portions of said elements being mechanically attached to said plate.

13. An assembly as set forth in claim 3 including a plurality of said central members, said elements extending between adjacent members to that said elements extend from adjacent members in generally opposite directions.

14. A bumper assembly comprising: a pair of elongated overlapping members; projections extending laterally from said members at an acute angle relative thereto, the projections extending from one side of each of said members extending in the same general direction longitudinally of said member as the projections extending from the other side thereof and said projections interconnecting said overlapping members such that a force applied to one of said members will cause the other of said members to move in a longitudinal direction; and energy absorbing means disposed between said projections, said energy absorbing means comprising a compressible elastomeric material which completely fills the space between said projections for absorbing energy upon relative movement between said members.

15. An energy absorbing assembly comprising: at least a central and two generally parallel longitudinally extending means, said two longitudinally extending means being disposed on opposite sides of said central means, connection means extending from opposite sides of said central means and at an acute angle relative thereto and connected to said two longitudinally extending means, all of said connection means extending from one side of said central means extending at said angle in the same general direction longitudinally of said central means and in the same direction as all of the connection means extending from the other side thereof.

16. An assembly as set forth in claim 15 wherein all three of said longitudinally extending means are embedded in an energy absorbing material.

* * * * *